United States Patent
Shrestha et al.

(10) Patent No.: US 11,411,815 B1
(45) Date of Patent: Aug. 9, 2022

(54) SYSTEM FOR DATA CENTER ASSET RESOURCE ALLOCATION

(71) Applicant: Dell Products L.P., Round Rock, TX (US)

(72) Inventors: Saurav Shrestha, Round Rock, TX (US); Jeffrey M. Lairsey, Round Rock, TX (US); Carlin Mendonca, Austin, TX (US); Margaret Patton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/359,712

(22) Filed: Jun. 28, 2021

(51) Int. Cl.
*G06F 15/173* (2006.01)
*H04L 41/0816* (2022.01)

(52) U.S. Cl.
CPC .................. *H04L 41/0816* (2013.01)

(58) Field of Classification Search
CPC .................................................. H04L 67/1002
See application file for complete search history.

(56) References Cited

U.S. PATENT DOCUMENTS

| | | | | |
|---|---|---|---|---|
| 2007/0043860 A1* | 2/2007 | Pabari | ...................... | H04L 47/78 709/224 |
| 2008/0046167 A1* | 2/2008 | Small | ...................... | G06Q 10/00 701/120 |
| 2016/0371441 A1* | 12/2016 | Day | ...................... | G16H 40/20 |
| 2022/0086864 A1* | 3/2022 | Sabella | ............... | H04L 41/0893 |

OTHER PUBLICATIONS

Kubernetes, Production-Grade Container Orchestration, Automated container deployment, scaling and management, downloaded from the internet Jun. 28, 2021.
VMWare, vSphere, Unified Management for Container and VMs, downloaded from the internet Jun. 28, 2021.

* cited by examiner

*Primary Examiner* — Thanh T Nguyen
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: identifying a plurality of asset resources within a data center; selecting a workload for allocation of asset resources; maintaining an inventory of available asset resources from the asset resources of the plurality of asset resources; determining which asset resources of the plurality of asset resources to allocate to the workload, determination of which asset resources of the plurality of asset resources to allocate taking into account the inventory of the available asset resources; and, performing a data center asset allocation operation, the data center asset allocation operation allocating resources the workload based upon the determining.

20 Claims, 10 Drawing Sheets

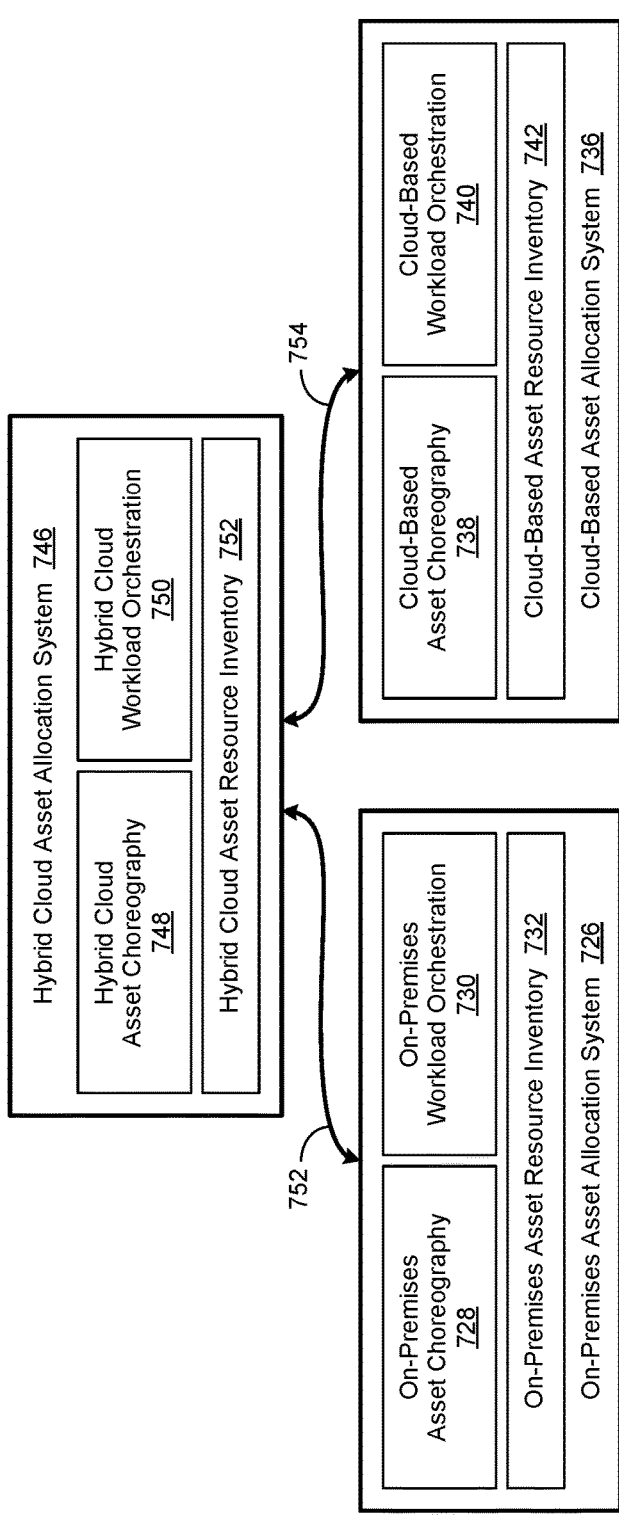
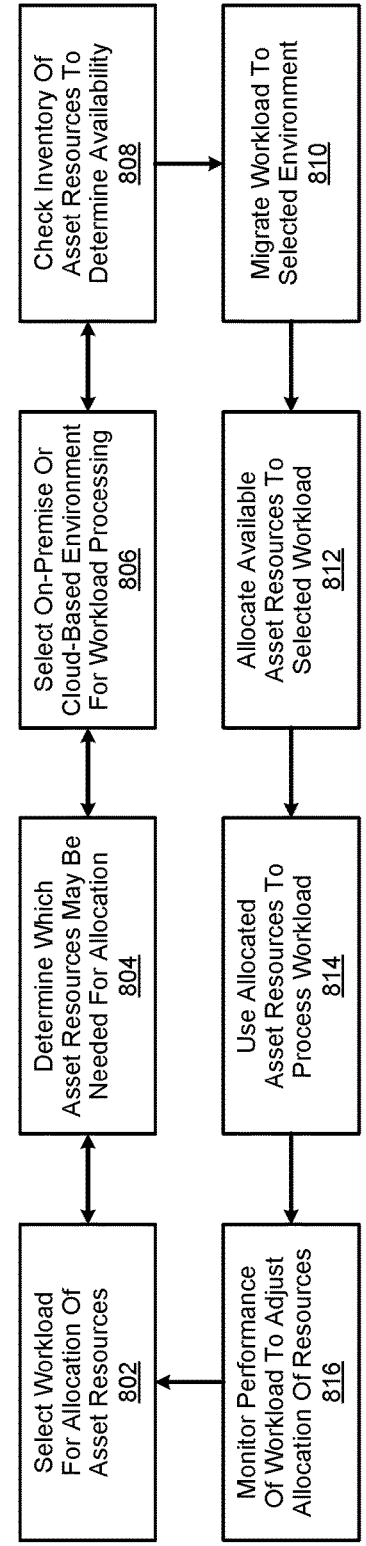
Figure 7
Figure 8

SYSTEM FOR DATA CENTER ASSET RESOURCE ALLOCATION

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: identifying a plurality of asset resources within a data center; selecting a workload for allocation of asset resources; maintaining an inventory of available asset resources from the asset resources of the plurality of asset resources; determining which asset resources of the plurality of asset resources to allocate to the workload, determination of which asset resources of the plurality of asset resources to allocate taking into account the inventory of the available asset resources; and, performing a data center asset allocation operation, the data center asset allocation operation allocating resources the workload based upon the determining.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a plurality of asset resources within a data center; selecting a workload for allocation of asset resources; maintaining an inventory of available asset resources from the asset resources of the plurality of asset resources; determining which asset resources of the plurality of asset resources to allocate to the workload, determination of which asset resources of the plurality of asset resources to allocate taking into account the inventory of the available asset resources; and, performing a data center asset allocation operation, the data center asset allocation operation allocating resources the workload based upon the determining.

In another embodiment the invention relates to a computer-readable storage medium embodying computer program code, the computer program code comprising computer executable instructions configured for: identifying a plurality of asset resources within a data center; selecting a workload for allocation of asset resources; maintaining an inventory of available asset resources from the asset resources of the plurality of asset resources; determining which asset resources of the plurality of asset resources to allocate to the workload, determination of which asset resources of the plurality of asset resources to allocate taking into account the inventory of the available asset resources; and, performing a data center asset allocation operation, the data center asset allocation operation allocating resources the workload based upon the determining.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 shows a simplified block diagram of a plurality of asset allocation systems implemented within a hybrid cloud environment;

FIG. 8 is a simplified process flow diagram showing the performance of data center asset resource allocation operations within a hybrid cloud environment;

DETAILED DESCRIPTION

Figure 1:
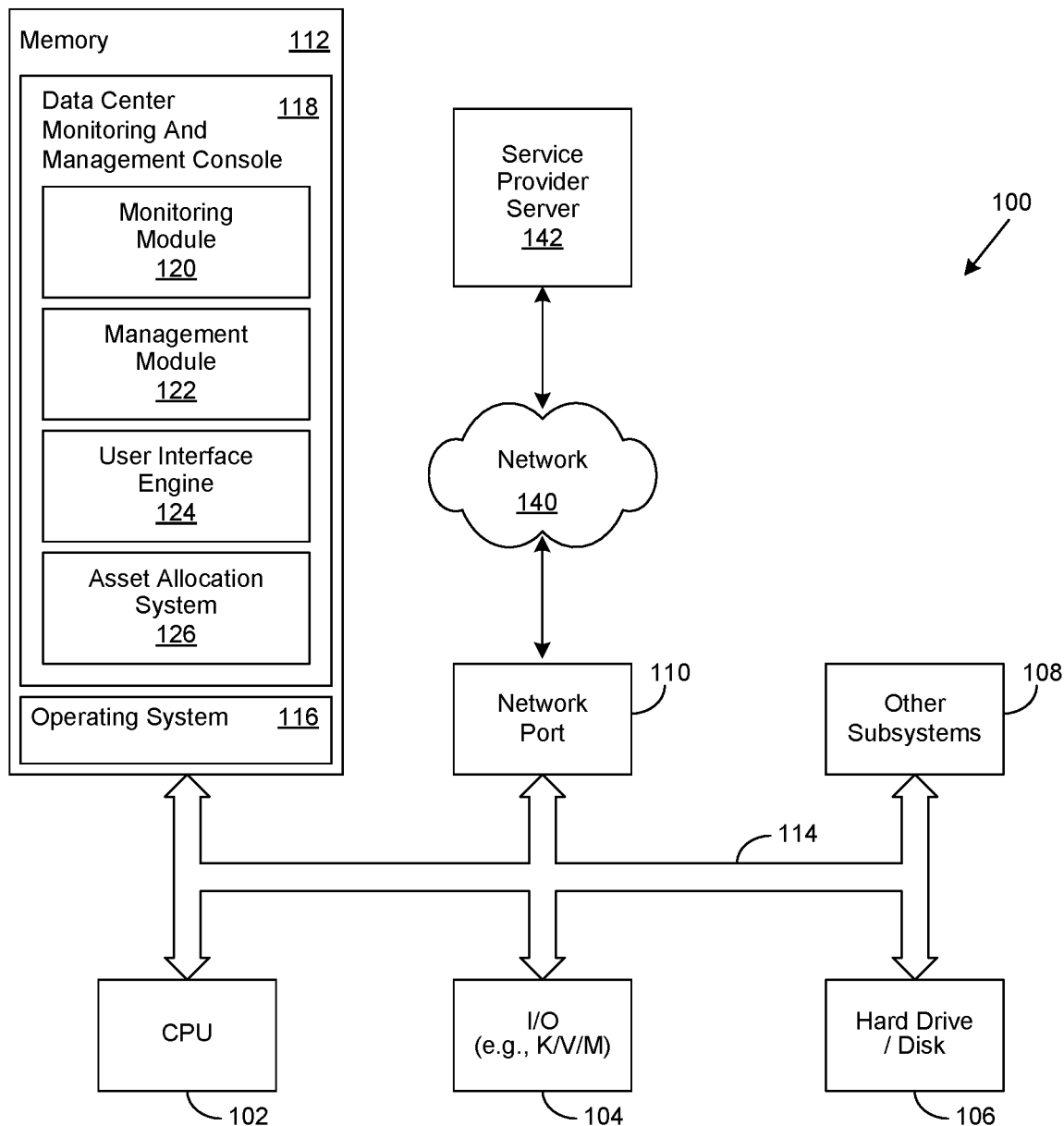
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Certain aspects of the invention likewise reflect an appreciation that knowledge of which data center asset resources within a particular data center environment are available for allocation may not always be available. Likewise, various aspects of the invention reflect an appreciation that certain data center asset resources, as described in greater detail herein, may be underutilized by a particular workload. Conversely, various aspects of the invention reflect an appreciation that certain data center asset resources may likewise be overutilized by the same workload. Accordingly, various aspects of the invention reflect an appreciation that it would be advantageous to know which data center assets may be underutilized, or overutilized, and which data center asset resources may be available for allocation to a particular workload.

Likewise, various aspects of the invention reflect an appreciation that processing a workload within an on-premises data center monitoring and management environment may offer certain advantages. As an example, an organization may believe that a workload running behind a firewall they own, operate, and manage may offer a higher level of security than if the workload was running within a cloud environment. As another example, an organization may have a substantial investment in certain data center assets and they may believe it is more cost effective to use what they already own rather than paying a third party for cloud services. However, various aspects of the invention likewise reflect an appreciation that it may be advantageous for an organization to take advantage of the benefits of a hybrid cloud data center monitoring and management environment, which may provide workload scaling and economies of scale that may not otherwise be possible.

Various aspects of the invention likewise reflect an appreciation that certain data center asset resources allocated to a particular workload may be underutilized. Certain aspects of the invention likewise reflect that it may be advantageous to allocate such underutilized to one or more other workloads. Likewise, certain aspects of the invention reflect an appreciation that such reallocation of data center asset resources will likely result in more efficient and effective processing of a plurality of workloads.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, a user interface engine 124, and an asset allocation system 126, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
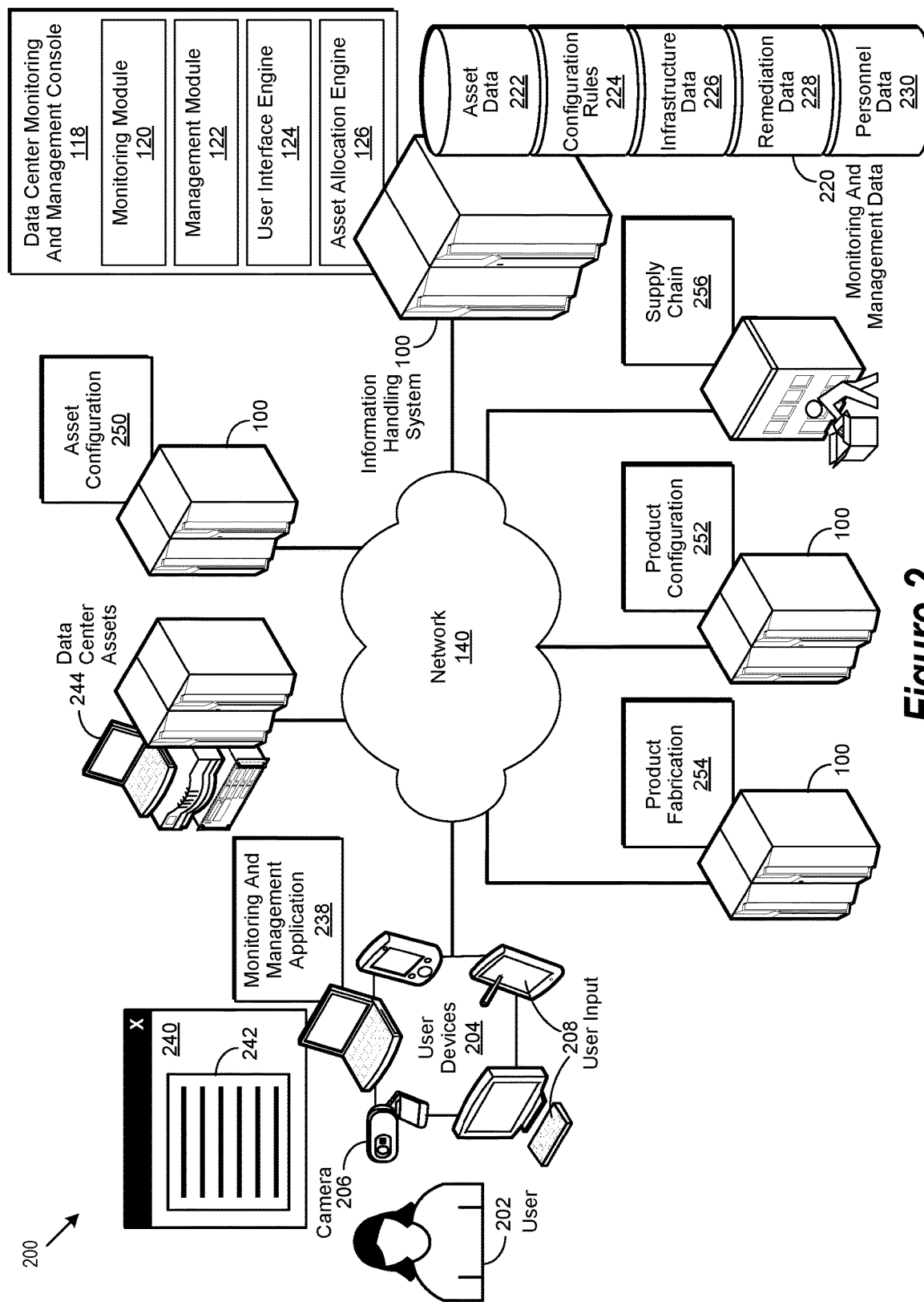
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, a user interface (UI) engine 124, and an asset allocation system 126, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244. In various embodiments, the asset allocation system 126 may be implemented to perform a data center asset allocation operation, described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 222 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204. such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
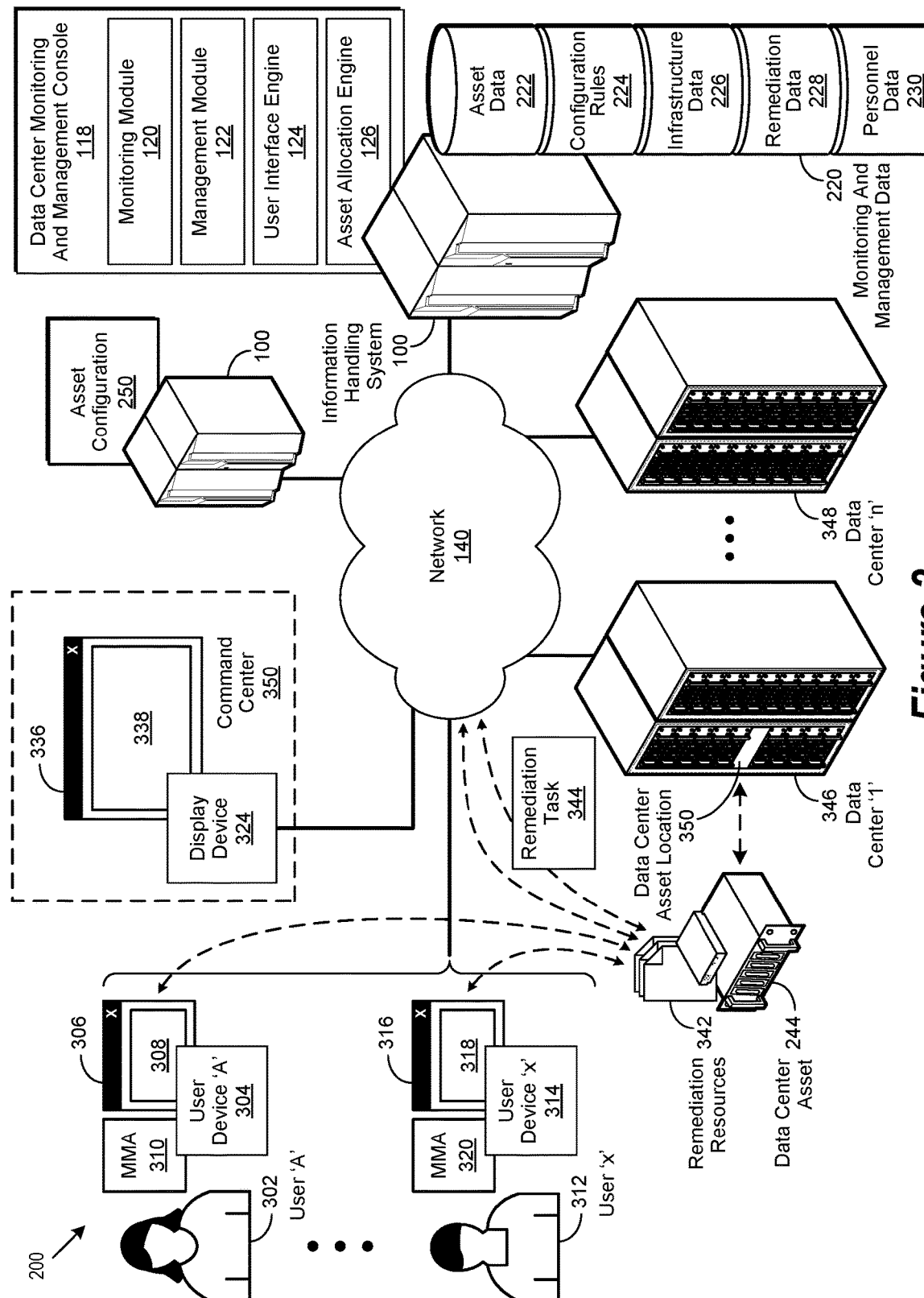
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, a user interface (UI) engine 124, and an asset allocation system 126, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
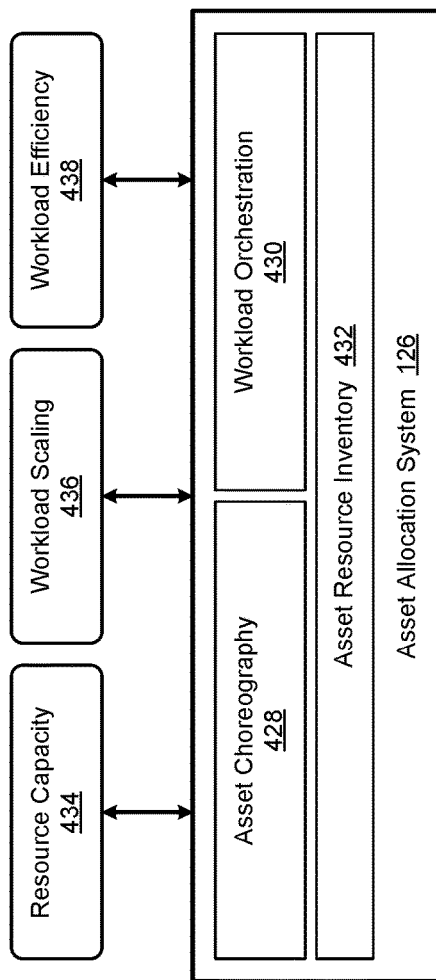
FIG. 4 shows a simplified block diagram of an asset allocation system implemented to allocate data center asset resources to a plurality of workloads.

FIG. 4 shows a simplified block diagram of an asset allocation system implemented in accordance with an embodiment of the invention to allocate data center asset resources to a plurality of workloads. In certain embodiments, a data center monitoring and management console, described in greater detail herein, may be implemented to include an asset allocation system 126. In certain embodiments, the asset allocation 126 system may be implemented to include an asset choreography 428 module, a workload orchestration 430 module, and a data center asset resource inventory 432 module, or a combination thereof.

In certain embodiments, the asset allocation system 126 may be implemented to perform a data center asset allocation operation. As used herein, a data center asset allocation operation broadly refers to any task, function, operation, procedure, or process performed to allocate the use of one or more resources associated with a data center asset, described in greater detail herein, to a particular workload. As likewise used herein, a data center asset resource broadly refers to a discrete aspect, element, or component of a data center asset that can be utilized, directly or indirectly, in whole or in part, to process a particular workload. Examples of data center asset resources include a central processing unit (CPU), or an individual core or cycles thereof, memory, such as random access memory (RAM), or a portion thereof, storage, such as a disk drive, or a portion thereof, an input/output (I/O) port, such as an I/O port of a server, router, or network switch, and so forth.

A workload, as used herein, broadly refers to a measure of information processing that can be performed by one or more data center asset resources, individually or in combination with one another, within a data center monitoring and management environment, described in greater detail herein. In certain embodiments, a workload may be implemented to be processed in a virtual machine (VM) environment, familiar to skilled practitioners of the art. In various embodiments, a workload may be implemented to be processed as a containerized workload, likewise familiar to those of skill in the art.

In certain embodiments, the asset choreography 428 module may be implemented to perform an asset choreography operation. As used herein, an asset choreography operation broadly refers to any task, function, operation, procedure, or process performed to track the allocation and utilization of certain data center asset resources within a data center monitoring and management environment, determine their availability for allocation, or reallocation, and once determined, allocate or reallocate their use to process a particular workload. In various embodiments, the sequence and steps of a particular asset choreography operation may be defined through the implementation of certain messages, rules of interaction, and operational agreements between two or more data center assets. In various embodiments, an asset choreography operation may be performed to track the use of certain data center asset resources within two or more data center monitoring and management environments, or one or more respective portions thereof, determine their availability for allocation, and once determined, allocate their use to process a particular workload.

In certain embodiments, the workload orchestration 430 module may be implemented to perform a workload orchestration operation. As used herein, a workload orchestration operation broadly refers to any task, function, operation, procedure, or process performed to implement one or more previously-allocated data center asset resources such that they can be used to process a particular workload. In various embodiments, the sequence and steps of a particular workload orchestration operation may be defined through the implementation of certain messages, rules of interaction, and operational agreements between two or more data center assets. In various embodiments, a workload orchestration operation may be performed to implement one or more previously-allocated data center asset resources within two or more data center monitoring and management environments, or one or more respective portions thereof, such that they can be used to process a particular workload.

In certain embodiments, the asset resource inventory 432 module may be implemented to perform an asset resource inventory operation. As used herein, an asset resource inventory operation broadly refers to any task, function, operation, procedure, or process performed to maintain an inventory of data center asset resources that are available for allocation to a particular workload. In various embodiments, one or more asset resource inventory operations may be performed to maintain an inventory of data center asset resources that are not currently allocated to a particular workload, and as such, may be available for allocation. In certain of these embodiments, data center asset resources that are not currently allocated to a particular workload may be held in reserve for future allocation to a particular workload, and as such, are not available for allocation to a different workload.

In certain embodiments, one or more asset resource inventory operations may be performed to maintain an inventory of data center asset resources that are currently allocated to a particular workload, but are underutilized, and as such may be available for allocation to a different workload. In these embodiments, the method by which such inventories are maintained, and the method by which it is determined that a particular data center asset resource may, or may not, be available for allocation to a particular workload, is a matter of design choice. In certain embodiments, such inventories may be stored in a repository of data center asset data, described in greater detail herein.

In certain embodiments, the asset choreography 428 module, the workload orchestration 430 module, and the asset resource inventory 432 module, or a combination thereof, may be used in the performance of a data center asset allocation operation to determine the capacity 434 of a particular data center asset resource. As used herein, the capacity 434 of a data center asset resource broadly refers to a measure of its operational ability to contribute to the processing of a particular workload. In various embodiments, the asset choreography 428 module, the workload orchestration 430 module, and the asset resource inventory 432 module, or a combination thereof, may be implemented to provide certain information associated with a particular data center asset resource's maximum capacity 434, or minimum capacity 434, or a combination thereof. In various embodiments, the asset choreography 428 module, the workload orchestration 430, and the asset resource inventory 432 module, or a combination thereof, may be implemented to provide certain information associated with the current or historical utilization of a particular data center asset resource's capacity 434.

As an example, a server may have two CPUs, each of which has eight cores. In this example, the maximum capacity 434 of each CPU is eight cores, and the minimum capacity 434 is one core. To continue the example, one of the CPUs may have five of its cores currently allocated to a particular workload. However, the same CPU may have had four of its cores allocated to the same workload at some point in the past, and three of its cores allocated to the same workload at some point before that. Accordingly, in this example, the current capacity 434 utilization of the CPU is five cores, and the historical capacity 434 utilization is four cores previously, and three cores before that.

In various embodiments, the asset choreography 428 module, the workload orchestration 430 module, and the asset resource inventory 432 module, or a combination thereof, may be implemented to determine the degree to which a particular workload may be scaled 436 according to the availability of certain data center asset resources. In various embodiments, the asset choreography 428 module, or the workload orchestration 430 module, or both, may be implemented to provide certain information associated with the degree to which a particular workload can be scaled 436 with its currently-allocated data center asset resources. In various embodiments, the asset choreography 428 module, or the workload orchestration 430 module, or both, may be implemented to provide certain information associated with the degree to which a particular workload can be scaled 436 if it were to be allocated certain available data center assets.

To continue the previous example, a particular workload may currently be allocated five out of eight CPU cores. In this example, the workload may be able to currently process a maximum of five hundred financial transactions a second. However, the performance of one or more data center asset allocation operations may indicate that the workload may be scaled 436 to process a maximum of eight hundred financial transactions a second if it were to be allocated all eight CPU cores.

In various embodiments, the asset choreography 428 module, the workload orchestration 430 module, and the asset resource inventory 432 module, or a combination thereof, may be implemented to determine the efficiency 438 of a particular workload according to its allocation of certain data center asset resources. In certain embodiments, the asset choreography 428 module, or the workload orchestration 430 module, or both, may be implemented to provide certain information associated with how efficiently 438 a particular workload can be processed with its currently-allocated data center asset resources. In various embodiments, the asset choreography 428 module, or the workload orchestration 430 module, or both, may be implemented to provide certain information associated with how efficiently 438 a particular workload can be processed if it were to be allocated certain additional data center asset resources if they are available.

To continue the previous example further, a particular workload may currently be allocated five out of eight CPU cores. In this example, the workload may currently be operating at fifty percent efficiency 438 due to the availability of CPU cycles provided by five cores. However, the performance of one or more data center monitoring and management operations may indicate that the efficiency 438 of the workload may improve to eighty percent if it were to be allocated to all eight CPU cores.

Figure 5:
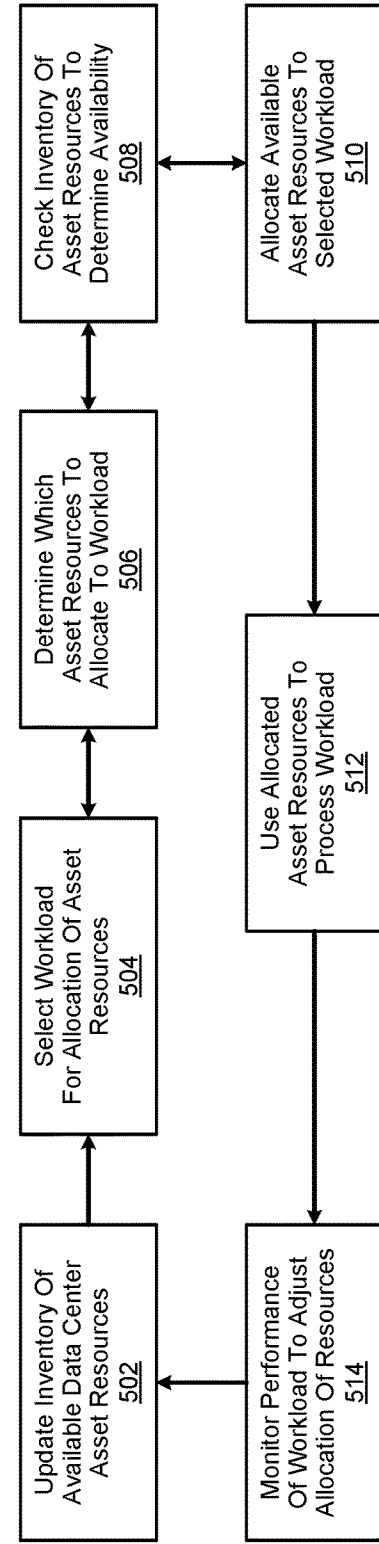
FIG. 5 is a simplified process flow diagram showing the performance of data center asset allocation operations.

FIG. 5 is a simplified process flow diagram showing the performance of data center asset allocation operations implemented in accordance with an embodiment of the invention. In this embodiment, an inventory of available data center asset resources is updated in step 502 to determine which data center asset resources may be available for allocation. In certain embodiments, one or more asset resource inventory operations, described in greater detail herein, may be performed to update the inventory of available data center asset resources. In step 504, a particular workload is selected for allocation of data center asset resources. Which data center asset resources to allocate to the selected workload are then determined in step 506. In this embodiment, the method by which a particular workload may be selected for allocation of data center asset resources, and the method by which it is determined which data center asset resources are selected to allocate to the selected workload, is a matter of design choice.

An inventory of available data center asset resources is then checked in step 508 to determine their availability for allocation to the selected workload. In certain embodiments, one or more asset resource inventory operations, may be performed to use the inventory of available data center asset resources to determine which data center asset resources are available for allocation to the selected workload. In certain embodiments, it may be determined that the previously-selected data center asset resources may not be available for allocation to the selected workload. In certain of these embodiments, an asset choreography operation, described in greater detail herein, may be performed to determine whether the previously-selected data center asset resources may be currently allocated to a different workload, but are underutilized. In various embodiments, an asset choreography operation may be performed to determine whether such a currently-allocated, but underutilized data center asset resource, is available for reallocation to the selected workload.

The previously-selected data center asset resources, if available, are then allocated to the selected workload in step 510. Then, in step 512, the allocated, or reallocated, data center asset resources are used to process the workload. Thereafter, performance of the workload is monitored in step 514 to determine whether its current allocation of data center asset resources should be adjusted. The process is then continued, proceeding with step 502.

Figure 6:
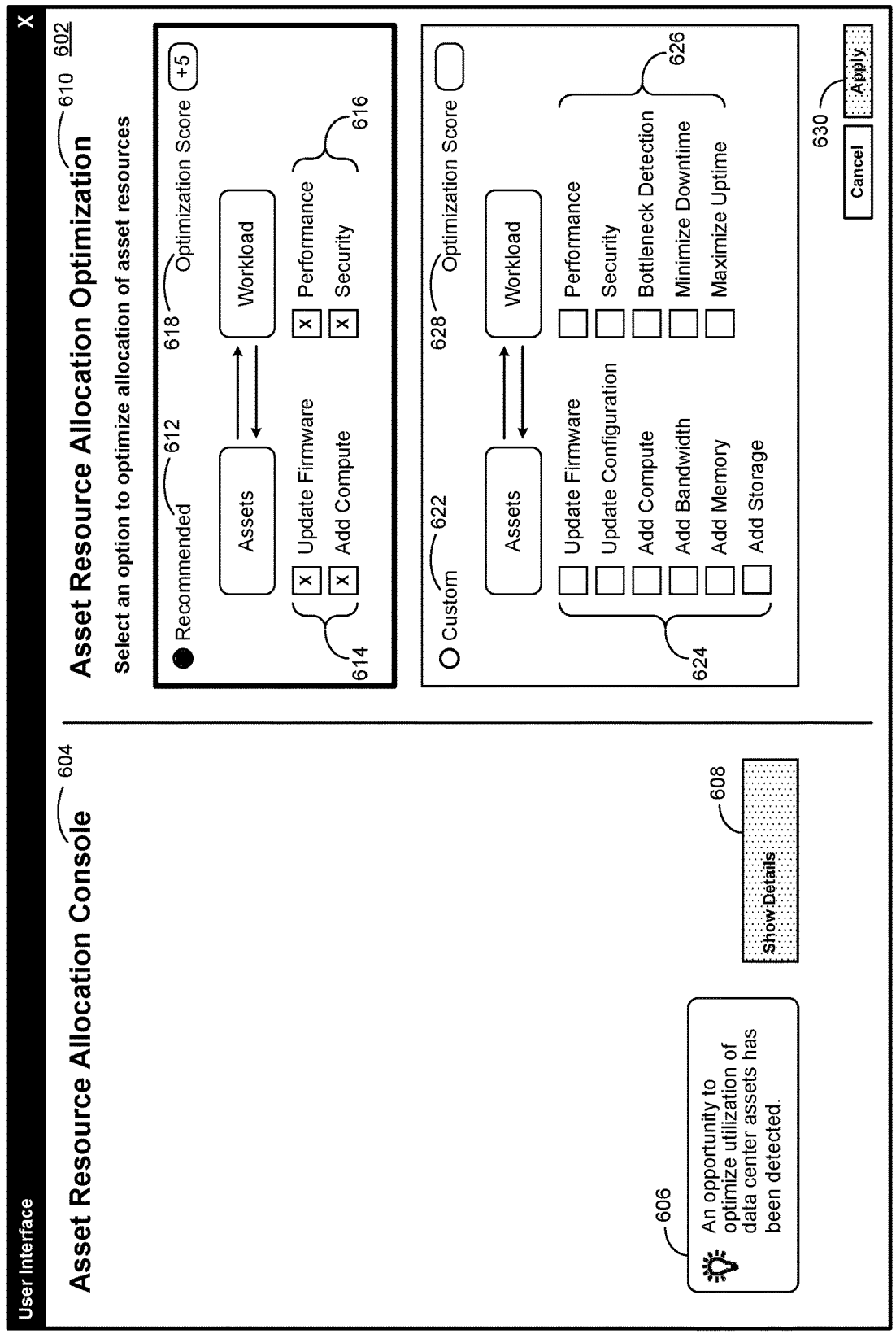
FIG. 6 shows an example screen presentation of a user interface (UI) implemented to allocate certain data center asset resources to optimize a workload.

FIG. 6 shows an example screen presentation of a user interface (UI) implemented in accordance with an embodiment of the invention to allocate certain data center asset resources to optimize a workload. In this embodiment, a data center monitoring and management console UI 602 is implemented to display an asset resource allocation console 604 window and an asset resource allocation optimization 610 window. As shown in FIG. 6, the data center monitoring and management console UI 602 may be implemented to provide an alert to a user, such as "An opportunity to optimize utilization of data center assets has been detected." within a console alert field 606. In response, the user selects the "Show Details" 608 command button through the use of a user gesture, such as a mouse click. As a result, the asset resource allocation optimization 610 window is displayed within the UI 602 of the data center monitoring and management console.

In various embodiments, as described in greater detail herein, a data center monitoring and management console may be implemented to perform one or more data center monitoring and management operations to recommend the allocation of certain data center assets 614, and certain aspects 616, of a particular workload to optimize, or otherwise improve, its performance. In various embodiments, the data center monitoring and management console may be implemented to receive certain user input related to which data center assets 624 they desire be allocated to a particular workload to optimize, or otherwise improve, its performance. In various embodiments, the data center monitoring and management console may likewise be implemented to receive certain user input related to which aspects 626 of a particular workload they desire to optimize, or otherwise improve. In various embodiments, the data center monitoring and management console may be implemented to receive certain user input related to a combination of which data center assets they desire be allocated to a particular workload and which aspects of a particular workload they desire to optimize, or otherwise improve, its performance. In these embodiments, the data center monitoring and management console UI 602 may be implemented to receive such user input.

As shown in FIG. 6, the asset resource allocation optimization 610 window may be implemented to include a "Recommended Asset Resource Allocation Optimization" 612 sub-window and a "Custom Asset Resource Allocation Optimization" 622 sub-window. In this embodiment, as likewise shown in FIG. 6, the "Recommended Asset Resource Allocation Optimization" 612 sub-window is implemented to show that allocation of certain data center asset resources 614, such as "Update Firmware" and "Add Compute" are recommended. Likewise, as shown in FIG. 6, the "Recommended Asset Resource Allocation Optimization" 612 sub-window is implemented to show that the aspects 616 of "Performance" and "Security" are recommended to optimize, or otherwise improve, the performance of an associated workload.

As shown in FIG. 6, the "Recommended Asset Resource Allocation Optimization" 612 sub-window is likewise implemented to include an optimization score 618 field. In various embodiments, the optimization score 618 field may be implemented to display an optimization score corresponding to the degree the performance of an associated workload is optimized, or otherwise improved, as a result of applying the data center asset resource 614 allocation and workload aspect 616 recommendations shown in the "Recommended Asset Resource Allocation Optimization" 612 sub-window. In these embodiments, the metrics used to characterize such an optimization score, and the method by which it is determined and presented, is a matter of design choice.

As likewise shown in FIG. 6, the "Custom Asset Resource Allocation Optimization" 622 sub-window may be implemented to receive user input to allocate certain data center asset resources 624, such as "Update Firmware," "Update Configuration," "Add Compute," "Add Bandwidth," "Add Memory," "Add Storage," and so forth. Likewise as shown in FIG. 6, the "Custom Asset Resource Allocation Optimization" 622 sub-window may be implemented to receive user input related to certain aspects 626 of a particular workload they desire to optimize, or otherwise improve, such as "Performance," "Security," "Bottleneck Detection," "Minimize Downtime," "Maximize Uptime," and so forth.

In various embodiments, selecting the "Apply" 630 command button within the data center monitoring and management console UI 602 results in the data center resource allocation 614 recommendations and the workload aspect 616 recommendations depicted in the "Recommended Asset Resource Allocation Optimization" 612 sub-window being applied. Likewise, in certain embodiments, selecting the "Apply" 630 command button within the data center monitoring and management console UI 602 results in the data center resource allocation 624 user selections and the workload aspect 626 user selections depicted in the "Custom Asset Resource Allocation Optimization" 622 sub-window being applied. In certain embodiments, the "Recommended Asset Resource Allocation Optimization" 612 sub-window may be likewise implemented to include an optimization score 618 field. In various embodiments, the optimization score 618 field may be implemented to display an optimization score corresponding to the degree the performance of an associated workload is optimized, or otherwise improved, as a result of applying the data center asset resource 614 allocation and workload aspect 616 user selections shown in the "Recommended Asset Resource Allocation Optimization" 612 sub-window.

FIG. 7 shows a simplified block diagram of a plurality of asset allocation systems implemented in accordance with an embodiment of the invention within a hybrid cloud environment. As used herein, a hybrid cloud environment broadly refers to a datacenter monitoring and management environment, described in greater detail herein, that is implemented to include both an on-premises data center monitoring and management environment and a cloud-based data center monitoring and management environment, both of which are likewise described in greater detail herein. Various embodiments of the invention reflect an appreciation that an organization may elect to perform certain workloads in one data center monitoring and management environment or another. Likewise, various embodiments of the invention reflect an appreciation that an organization may decide to move a workload from one data center monitoring and management environment to another. Accordingly, certain embodiments of the invention reflect an appreciation that the ability to move a workload from an on-premises data center monitoring and management environment to a cloud-based data center monitoring and management environment, or vice versa, may be advantageous.

In certain embodiments, an asset allocation system, described in greater detail herein, may be implemented as an on-premises asset allocation system 726, a cloud-based asset allocation system 736, and a hybrid cloud asset allocation system 746. In certain embodiments, the on-premises asset allocation system 726 may be implemented to include an on-premises asset choreography 728 module, an on-premises workload orchestration 730, and an on-premises asset resource inventory 732 module, or a combination thereof. In certain embodiments, the cloud-based asset allocation system 736 may be implemented to include a cloud-based asset choreography 738 module, a cloud-based workload orchestration 740 module, and a cloud-based asset resource inventory 742 module, or a combination thereof. In certain embodiments, the hybrid cloud asset allocation system 746 may be implemented to include a hybrid cloud asset choreography 748 module, a hybrid cloud workload orchestration 750 module, and a hybrid cloud asset resource inventory 752 module, or a combination thereof.

In certain embodiments, the on-premises asset allocation system 726 may be implemented in an on-premises data center monitoring and management environment. As used herein, an on-premises data center monitoring and management environment broadly refers to a data center monitoring and management environment whose associated data center assets are directly or indirectly owned, operated, or managed, or a combination thereof, by a user or an associated organization. In certain embodiments, the on-premises asset choreography 728 module may be implemented to perform an asset choreography operation, described in greater detail herein, within an on-premises data center monitoring and management environment. In certain embodiments, the on-premises workload orchestration 730 module may be implemented to perform a workload orchestration operation, likewise described in greater detail herein, within an on-premises data center monitoring and management environment. In certain embodiments, the on-premises asset resource inventory 732 module may be implemented to perform an asset resource inventory operation, described in greater detail herein, within an on-premises data center monitoring and management environment.

In certain embodiments, the cloud-based asset allocation system 736 may be implemented in a cloud-based data center monitoring and management environment. As used herein, a cloud-based data center monitoring and management environment broadly refers to a cloud computing environment, familiar to skilled practitioners or the art, whose associated data center assets are directly or indirectly operated, or managed, or both, on behalf of a user or an associated organization. In certain embodiments, the cloud-based asset choreography 738 module may be implemented to perform an asset choreography operation within a cloud-based data center monitoring and management environment. In certain embodiments, the cloud-based workload orchestration 740 module may be implemented to perform a workload orchestration operation within a cloud-based data center monitoring and management environment. In certain embodiments, the cloud-based asset resource inventory 732 module may be implemented to perform an asset resource inventory operation, described in greater detail herein, within a cloud-based data center monitoring and management environment.

In certain embodiments, the hybrid cloud asset allocation system 746 may be implemented in either an on-premises data center monitoring and management environment, or a cloud-based data center monitoring and management environment, or both. In certain embodiments, the hybrid cloud asset allocation system 746 may be implemented to coordinate one or more data center asset allocation operations respectively performed by the on-premises asset allocation system 726 and the cloud-based asset allocation system 736. In certain embodiments, the hybrid cloud asset choreography 748 module may be implemented to coordinate one or more asset choreography operations respectively performed by the on-premises asset choreography 728 module and the on-premises workload orchestration 730 module. In certain embodiments, the hybrid cloud workload orchestration 750 module may be implemented to coordinate one or more workload orchestration operations respectively performed by the on-premises asset choreography 738 module and the cloud-based workload orchestration 740 module. In certain embodiments, the hybrid cloud asset resource inventory 752 module may be implemented to coordinate one or more asset resource inventory operations respectively performed by the on-premises asset resource inventory 732 module and the cloud-based asset resource inventory 742 module.

In various embodiments, certain messages, rules of interaction, and operational agreements may be exchanged between the hybrid cloud asset allocation system 746, the on-premises asset allocation system 726, the cloud-based asset allocation system 736, and their respective modules during the coordination of a data asset allocation operation, an asset orchestration operation, a workload orchestration operation, an asset resource inventory operation, or a combination thereof. In certain embodiments, such messages, rules of interaction, and operational agreements may be respectively exchanged between the hybrid cloud asset allocation system 746, the on-premises asset allocation system 726, and the cloud-based asset allocation system 736, via a network connection 752, 754. In certain embodiments, one or more application program interfaces (APIs) may be implemented to communicate such messages, rules of interaction, and operational agreements that may be respectively exchanged between the hybrid cloud asset allocation system 746, the on-premises asset allocation system 726, and the cloud-based asset allocation system 736, via the network connections 752, 754.

In various embodiments, the hybrid cloud allocation system 746 may be implemented to track the allocation and utilization of certain data center asset resources within one or more on-premises data center monitoring and management environments and one or more cloud-based data center monitoring and management environments. In certain of these embodiments, the hybrid cloud allocation system 746 may likewise be implemented to determine the availability of such data center assets for allocation, or reallocation, and once determined, coordinate the allocation, or reallocation, of their use to process a particular workload. In certain embodiments, the hybrid cloud allocation system 746 may be implemented to use a hybrid cloud inventory of data center assets to determine which may be available for allocation to a particular workload and which are not.

As used herein, a hybrid cloud inventory of data center assets broadly refers to an aggregate inventory of data center assets associated with one or more on-premises data center monitoring and management environments, or a portion thereof, and one or more cloud-based data center monitoring and management environments, or a portion thereof. In various embodiments, the hybrid cloud allocation system 746 may be implemented to use the hybrid cloud asset resource inventory 752 module to generate the hybrid cloud inventory of data center asset resources. In various embodiments, the hybrid cloud asset resource inventory 752 module may be implemented to use the hybrid cloud inventory of data center asset resources to determine the allocation status of certain data center asset resources, their current utilization, and their availability for allocation or reallocation, or a combination thereof.

In certain embodiments, the hybrid cloud allocation system 746 may be implemented to coordinate the migration of a particular workload from an on-premises data center monitoring and management environment to a cloud-based data center monitoring and management environment, or vice versa. As an example, a particular workload that is being currently being processed in an on-premises data center monitoring and management environment may need to be scaled. Furthermore, it may be desirable to increase its efficiency. Accordingly, it may need to be allocated additional data center asset resources to achieve these scalability and efficiency goals.

In this example, the workload may currently be allocated five cores of one central processing unit (CPU) in a server, thirty two gigabytes of random access memory (RAM) in the same server, and sixteen terabytes (TB) of random array of independent (RAID) storage. To continue the example, the workload is currently consuming eighty percent of its allocated CPU cores, ninety five percent of its allocated memory, and fifty percent of its allocated RAID storage. To continue the example further, the workload may be operating at sixty percent efficiency and the goal may be to scale its capacity by one hundred percent while simultaneously improving its efficiency.

To continue the example yet further, the on-premises asset choreography 728 module may be implemented to perform an asset choreography operation to determine which, if any, data center assets within the on-premises data center monitoring and management environment may be available for allocation to the workload. In further continuance of the example, the results of the asset choreography operation may indicate there is only one additional CPU core available for allocation, eight gigabytes of RAM available, and four terabytes of RAID storage available for allocation to the workload. Unfortunately, in this example, the on-premises data center assets available for allocation to the workload are insufficient to meet its scalability and efficiency goals.

Accordingly, the on-premises asset allocation system 726 first places a request to the hybrid cloud asset allocation system 746 to determine the availability of cloud-based data center assets that may be used to scale the workload and improve its efficiency. In response, the hybrid cloud asset allocation system 746 queries the cloud-based asset allocation system 736 to determine whether the needed data center asset resources are available. In response, the cloud-based asset allocation system 736 may respond that it does, after which, the hybrid cloud asset allocation system 746 notifies the on-premises asset allocation system 726 that the needed data center asset resources are available.

Thereafter, the hybrid cloud workload orchestration 750 module communicates with the on-premises workload orchestration 730 module and the cloud-based workload orchestration 740 module to coordinate the migration of the workload. In this example, the first step of the migration is to create a copy of the workload within the cloud-based data center monitoring and management environment. Once the copy of the workload has been created, the cloud-based asset choreography 738 module performs an asset choreography operation to allocate whatever cloud-based data center asset resources may be needed by the workload to achieve its scalability and efficiency goals.

Once allocated, the cloud-based workload orchestration 740 module performs one of more cloud-based workload orchestration operations to implement the cloud-based data center assets for use by the copy of the workload. Thereafter, the workload is migrated from the on-premises data center monitoring and management environment to its copy in the cloud-based data center monitoring and management environment. The original workload in the on-premises data center monitoring and management environment is ended and its associated on-premises data center asset resources are released and made available for allocation in the future.

FIG. 8 is a simplified process flow diagram showing the performance of data center asset resource allocation operations implemented in accordance with an embodiment of the invention within a hybrid cloud environment. In this embodiment, a particular workload is selected in step 802 for allocation of data center asset resources, followed by determining which data center assets may be needed for allocation in step 804. A particular on-premises data monitoring and management environment or a particular cloud-based data center monitoring and management environment is then selected to process the workload in step 806.

An inventory of the selected data center monitoring and management environment's data center asset resources is then checked in step 808 to determine whether the data center asset resources needed by the selected workload are available. In certain embodiments, one or more asset resource inventory operations, may be performed to use the inventory of available data center asset resources to determine which data center asset resources are available for allocation to the selected workload. In certain embodiments, it may be determined that the previously-selected data center asset resources may not be available within the selected data center monitoring and management environment for allocation to the selected workload.

In certain of these embodiments, an asset choreography operation, described in greater detail herein, may be performed to determine whether the previously-selected data center asset resources may be currently allocated to a different workload, but are underutilized. In various embodiments, an asset choreography operation may be performed to determine whether such a currently-allocated, but underutilized data center asset resource, is available for reallocation to the selected workload. In this embodiment, the method by which a particular workload may be selected for allocation, or reallocation, of data center asset resources, and the method by which it is determined which data center asset resources are selected to allocate, or reallocate, to the selected workload, is a matter of design choice.

Once it is determined that the data center assets needed for allocation, or reallocation, to the selected workload are available, the workload is migrated to the selected data center monitoring and management environment in step 810, as described in greater detail herein. In certain embodiments, a hybrid cloud allocation system, described in greater detail herein, may be implemented to coordinate the migration of a particular workload from an on-premises data center monitoring and management environment to a cloud-based data center monitoring and management environment, or vice versa, once the selection is made.

The available data center asset resources are then allocated to the selected workload in step 812. Then, in step 814, the allocated data center asset resources are used to process the workload. Thereafter, performance of the workload is monitored in step 816 to determine whether its current allocation of data center asset resources should be adjusted. The process is then continued, proceeding with step 802.

Figure 9:
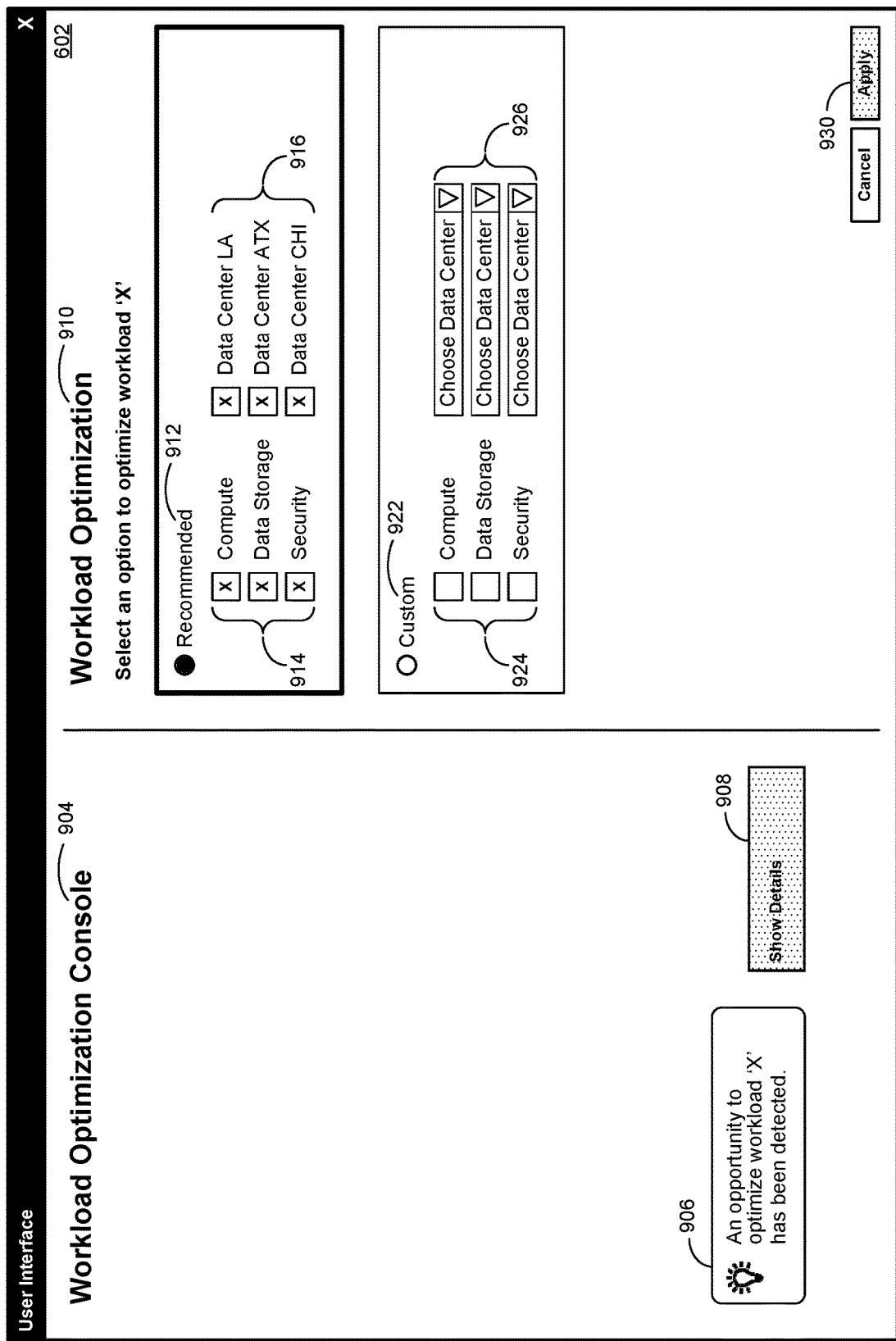
FIG. 9 shows an example screen presentation of a UI implemented to allocate data center asset resources to optimize a workload within a hybrid cloud environment.

FIG. 9 shows an example screen presentation of a user interface (UI) implemented in accordance with an embodiment of the invention to allocate certain data center asset resources to optimize a workload in a hybrid environment. In this embodiment, a data center monitoring and management console UI 602 is implemented to display a workload optimization console 904 window and a workload optimization 910 window. As shown in FIG. 9, the data center monitoring and management console UI 602 may be implemented to provide an alert to a user, such as "An opportunity to optimize workload 'X' has been detected." within a console alert field 906. In response, the user selects the "Show Details" 908 command button through the use of a user gesture, such as a mouse click. As a result, the workload optimization 910 window is displayed within the UI 602 of the data center monitoring and management console.

In various embodiments, as described in greater detail herein, a data center monitoring and management console may be implemented to perform one or more data center monitoring and management operations to recommend the allocation of certain data center assets 914, that may be available at certain data centers 916, to optimize, or otherwise improve, the performance of a particular workload. In various embodiments, the data center monitoring and management console may be implemented to receive certain user input related to which data center assets 924 they may desire to be allocated, at a particular data center 926, to a particular workload to optimize, or otherwise improve, its performance. In these embodiments, the data center monitoring and management console UI 602 may be implemented to receive such user input.

As shown in FIG. 9, the workload optimization 910 window may be implemented to include a "Recommended Workload Optimization" 912 sub-window and a "Custom Workload Optimization" 922 sub-window. In this embodiment, as likewise shown in FIG. 9, the "Recommended Workload Optimization" 912 sub-window is implemented to show that allocation of certain data center asset resources 914, such as "Compute," "Data Storage," and "Security," respectively corresponding to data centers 916 "LA", 'ATX, and 'CHI' are recommended. As likewise shown in FIG. 9, the "Custom Workload Optimization" 922 sub-window may be implemented to receive user input to allocate certain data center asset resources 924, such as "Compute," "Data Storage," and "Security," respectively located at a particular data center 926, which the user selects.

In various embodiments, selecting the "Apply" 930 command button within the data center monitoring and management console UI 602 results in the data center resource allocation 914 recommendations, respectively corresponding to data centers 916 "LA", 'ATX, and 'CHI' depicted in the "Recommended Workload Optimization" 912 sub-window being applied. Likewise, in certain embodiments, selecting the "Apply" 930 command button within the data center monitoring and management console UI 602 results in the data center resource allocation 924 user selections and the data center 926 user selections depicted in the "Custom Workload Optimization" 922 sub-window being applied.

Figure 10:
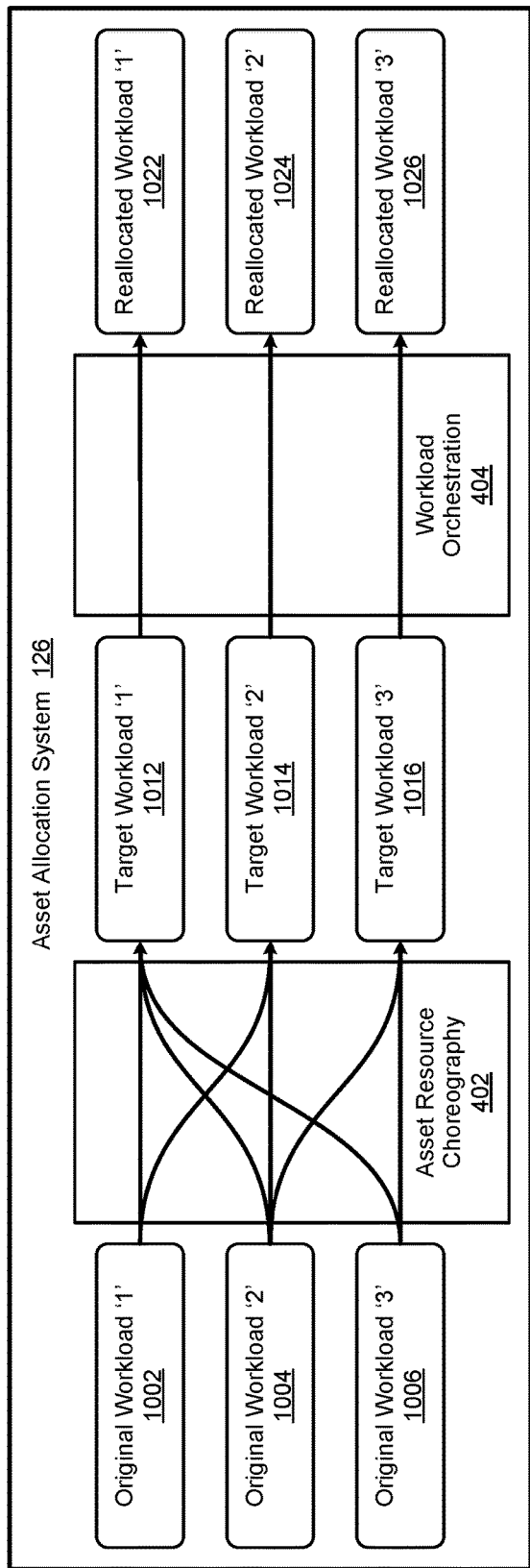
FIG. 10 is a functional block diagram showing the reallocation of data center asset resources.

FIG. 10 is a functional block diagram showing the reallocation of data center asset resources implemented in accordance with an embodiment of the invention. In certain embodiments, an asset allocation system 126 may be implemented to reallocate underutilized data asset resources from one workload to another. In certain embodiments, a workload may be implemented to be processed in a virtual machine (VM) environment, familiar to skilled practitioners of the art. In various embodiments, a workload may be implemented to be processed as a containerized workload, likewise familiar to those of skill in the art.

In certain embodiments, an asset allocation system 126 may be implemented with an asset resource choreography 428 module and a workload orchestration 430 module, as described in greater detail herein. In certain embodiments, the asset allocation system 126 may be implemented to perform a data center asset resource allocation operation, described in greater detail herein, to determine which data center assets within a particular data center monitoring and management environment may be currently allocated to each of a plurality of workloads (e.g., original workloads '1' 1002, '2' 1004, and '3' 1006). In certain embodiments, the asset allocation system 126 may likewise be implemented to perform a data center asset resource allocation operation to determine which data center assets currently allocated to original workloads may be underutilized.

Likewise, in certain embodiments, the asset allocation system 126 may be implemented to determine which of the original workloads may benefit from the use of the underutilized data center assets. In certain embodiments, the asset allocation system 126 may be implemented to designate which underutilized data center assets should be respectively allocated to which original workload. In certain embodiments, the asset allocation system 126 may likewise be implemented to generate a target workload (e.g., target workloads '1' 1012, '2' 1014, and '3' 1016), respectively corresponding to each original workload.

In certain embodiments, the asset choreography 428 module may be implemented to perform an asset choreography operation, likewise described in greater detail herein, to allocate the previously-identified underutilized data center asset resources to its designated target workload. In certain embodiments, the workload orchestration 430 module, as described in greater detail herein, may then be implemented to perform a workload orchestration operation to respectively implement the previously-allocated data center resources for each designated target workload. Once the previously-allocated data center resources have been respectively implemented for each target workload, the workload orchestration 430 module may likewise be implemented in certain embodiments to convert each target workload to a corresponding reallocated workload (e.g., reallocated workloads '1' 1022, '2' 1024, and '3' 1026). In certain embodiments, the asset allocation system 126 may then be implemented to end each original workload (e.g., original workloads '1' 1002, '2' 1004, and '3' 1006) and release their associated data center asset resources to make them available for allocation in the future.

Figure 11:
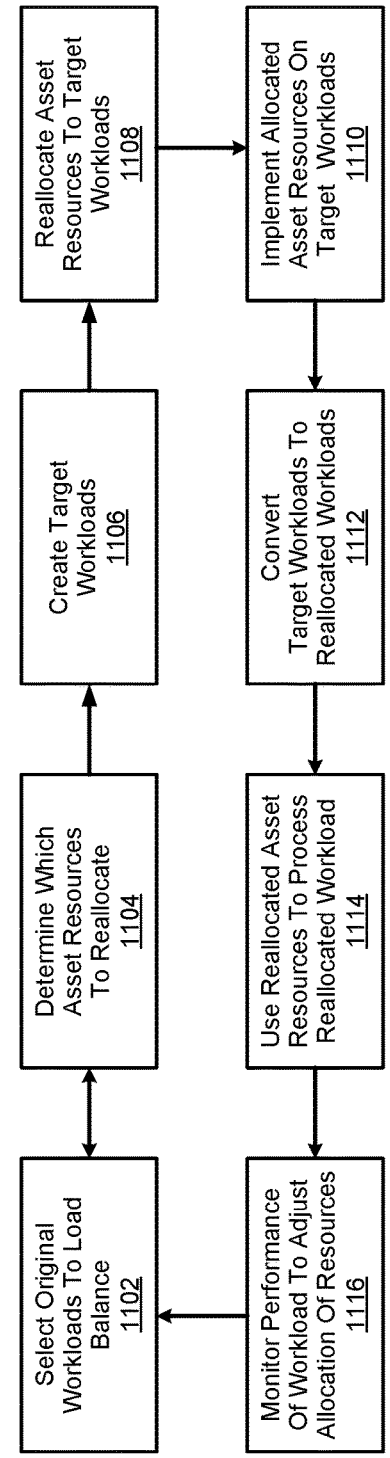
FIG. 11 is a simplified process flow diagram showing the performance of data center asset resource reallocation operations.

FIG. 11 is a simplified process flow diagram showing the performance of data center asset resource reallocation operations implemented in accordance with an embodiment of the invention. In this embodiment, a plurality of original workloads, described in greater detail herein, are selected in step 1102, followed by an analysis being performed in step 1104 to determine which under-utilized data center assets are available for reallocation to other workloads. Target workloads, respectively corresponding to each of the plurality of original workloads, are then created in step 1106.

One or more asset choreography operations, described in greater detail herein, are then performed in step 1108 to reallocate certain underutilized data center assets to their designated target workloads. One or more workload orchestration operations, likewise described in greater detail herein, are then performed in step 1110 to implement the reallocated data center asset resources for their designated target workloads. Once the reallocated data center assets have been implemented for their respective target workloads, they are converted into reallocated workloads in step 1112, as described in greater detail herein. Then, in step 1114, the reallocated data center asset resources are used to process the reallocated workload. Thereafter, performance of the reallocated workload is monitored in step 1116 to determine whether its current allocation of data center asset resources should be adjusted. The process is then continued, proceeding with step 1102.

Figure 12:
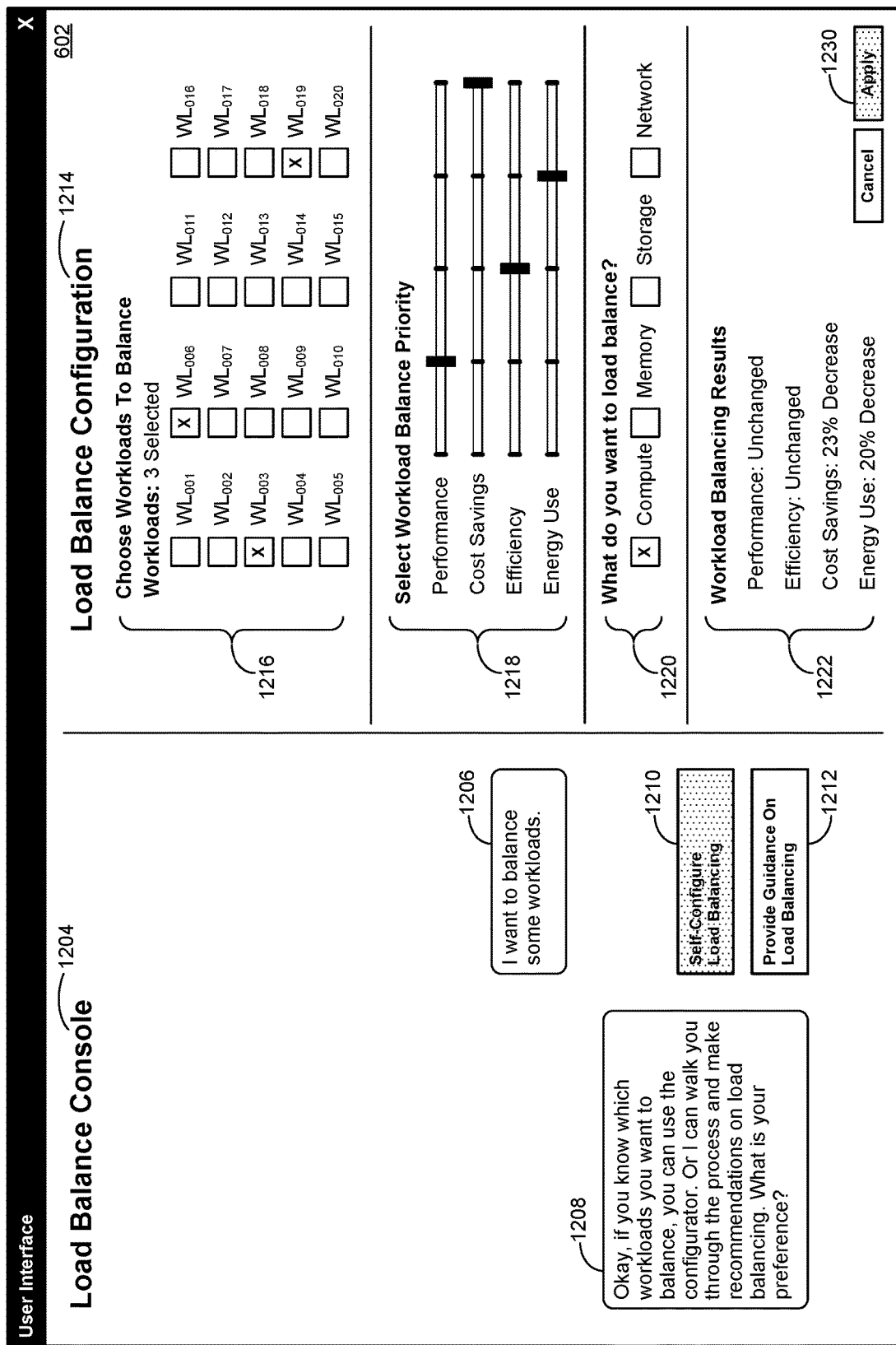
FIG. 12 shows an example screen presentation of a UI used to reallocate data center asset resources to load balance a plurality of associated workloads.

FIG. 12 shows an example screen presentation of a user interface (UI) implemented in accordance with an embodiment of the invention to reallocate data center asset resources to load balance a plurality of associated workloads. In this embodiment, a data center monitoring and management console UI 602 is implemented to display a load balance console 1204 window and a load balance configuration 1214 window. As shown in FIG. 12, a user may enter a request, such as "I want to balance some workloads." into a user request field 1206. In response, the data center monitoring and management console UI 602 may be implemented to respond with a response, such as "Okay, if you know which workloads you want to balance, you can use the configurator. Or I can walk you through the process and make recommendations on load balancing. What is your preference?" within a console response field 1208.

In certain embodiments, the data center monitoring and management console UI 602 may be implemented to respond with one or more command buttons, such as "Self-Configure Load Balancing" 1210 or "Provide Guidance On Load Balancing" 1212. In this embodiment, the user selects the "Self-Configure Load Balancing" 1210 command button through the use of a user gesture, such as a mouse click. As a result, the load balance configuration 1214 window is displayed within the UI 602 of the data center monitoring and management console.

As likewise shown in FIG. 12, the load balance configuration 1214 window may be implemented to include a "Choose Which Workloads To Balance" 1216 sub-window, a "Select Priority" 1218 sub-window, a "What do you want to load balance?" 1220 sub-window, and a "Workload Balancing Results" 122 sub-window. In this embodiment, the "Choose Which Workloads To Balance" 1216 sub-window is implemented to present a plurality of workloads that can be selected for load balancing. As an example, workloads $WL_{003}$, $WL_{006}$, and $WL_{019}$ have been selected.

In this embodiment, the "Select Workload Balance Priority" 1216 sub-window is implemented to present a plurality of priorities that can be selected for load balancing the workloads selected in the "Choose Which Workloads to Balance" 1216 sub-window. As an example, in certain embodiments the priorities may be "Performance," "Cost Savings," "Efficiency," "energy use," and so forth. In certain embodiments, the data center monitoring and management console UI 602 may be implemented to allow the user to select the relative prioritization (e.g., low to high) of one workload balance priority to another. For example, as shown in FIG. 12, "Cost Savings" has the highest priority, followed by "Energy Use," then "Efficiency," and finally "Performance."

Likewise, the "What do you want to load balance?" 1220 sub-window has been implemented in this embodiment to present a plurality of data center asset resources to the user for selection. In certain embodiments, the user may select one or more data center resources to select a preference for which data asset resource is given priority when two or more workloads are being balanced. For example, as shown in FIG. 12, the "Compute" data center asset has been selected. Accordingly, in this example, the utilization of computer processing unit (CPU) cores is given preference over memory, storage, and network resources when workloads $WL_{003}$, $WL_{006}$, and $WL_{019}$ are being load balanced.

As shown in FIG. 12, selecting the "Apply" 1220 command button within the data center monitoring and management console UI 602 results in the selections made in the "Choose Which Workloads To Balance" 1216 sub-window, the "Select Priority" 1218 sub-window, and the "What do you want to load balance?" 1220 sub-windows being applied. The results of applying the selections are then displayed within the "Workload Balancing Results" 122 sub-window. For example, the results displayed within the "Workload Balancing Results" 122 sub-window shows performance and efficiency of workloads $WL_{003}$, $WL_{006}$, and $WL_{019}$ are unchanged, while a cost savings of 23% and a 20% decrease in energy consumption is realized.

Figure 13:
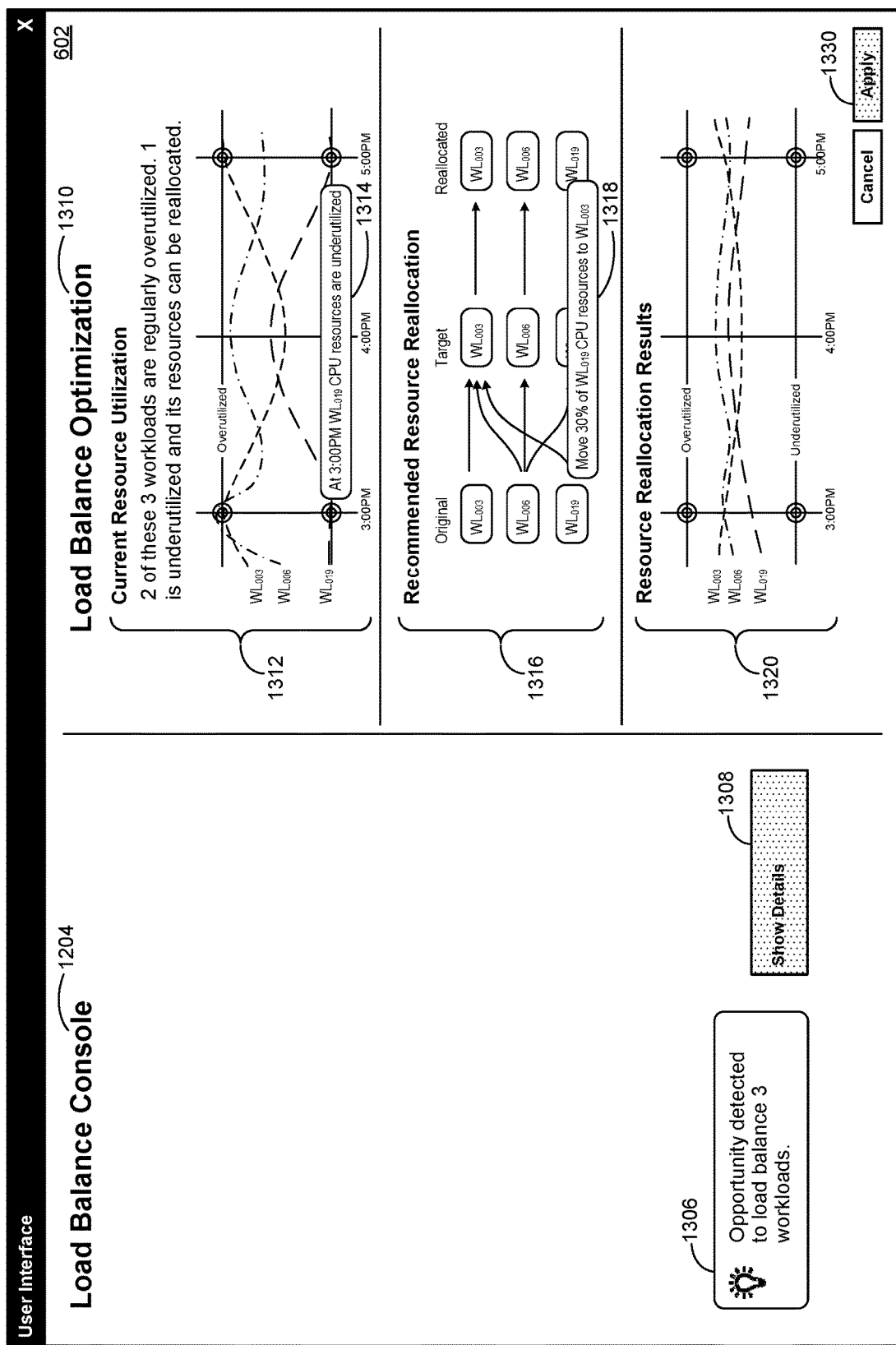
FIG. 13 shows an example screen presentation of a UI used to graphically depict the results of reallocating data center asset resources associated with a plurality of associated workloads.

FIG. 13 shows an example screen presentation of a user interface (UI) implemented in accordance with an embodiment of the invention to graphically depict the results of reallocating data center asset resources associated with a plurality of associated workloads. In this embodiment, a data center monitoring and management console UI 602 is implemented to display a load balance console 1204 window and a load balance optimization 1310 window. As shown in FIG. 13, the data center monitoring and management console UI 602 may be implemented to provide an alert to a user, such as "Opportunity detected to load balance 3 workloads?" within a console alert field 1306. In response, the user selects the "Show Details" 1308 command button through the use of a user gesture, such as a mouse click. As a result, the load balance optimization 1310 window is displayed within the UI 602 of the data center monitoring and management console.

As likewise shown in FIG. 13, the load balance optimization 1310 window may be implemented to include a "Current Resource Utilization" 1312 sub-window, a "Recommended Resource Reallocation" 1316 sub-window, and a "Resource Reallocation Results" 1320 sub-window. In this embodiment, the "Current Resource Utilization" 1312 sub-window is implemented to graphically depict the utilization of certain data center asset resources by an associated plurality of workloads, such as workloads $WL_{003}$, $WL_{006}$, and $WL_{019}$. Likewise, as shown in FIG. 13, the data center monitoring and management console UI 602 may be implemented in various embodiments to provide certain explanatory detail 1314 related to current data asset resource utilization, such as "At 3:00 PM $WL_{019}$ CPU resources are underutilized."

In this embodiment, the "Recommended Resource Reallocation" 1316 sub-window is implemented to graphically depict the recommended reallocation of certain data center asset resources to an associated plurality of workloads, such as workloads $W_{003}$, $W_{006}$, and $WL_{019}$. Likewise, as shown in FIG. 13, the data center monitoring and management console UI 602 may be implemented in various embodiments to provide certain explanatory detail 1318 related to certain data asset reallocation recommendations, such as "Move 30% of $WL_{019}$ CPU resources to $W_{003}$." As likewise shown in FIG. 13, selecting the "Apply" 1330 command button within the data center monitoring and management console UI 602 results in the data center resource reallocation recommendations depicted in the "Resource Reallocation Results" 1320 sub-window being applied. The results of applying the recommendations are the graphically depicted within the "Recommended Resource Reallocation" 1316 sub-window.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:

identifying a plurality of asset resources within a data center;

selecting a workload for allocation of asset resources;

maintaining an inventory of available asset resources from the asset resources of the plurality of asset resources;

determining which asset resources of the plurality of asset resources to allocate to the workload, determination of which asset resources of the plurality of asset resources to allocate taking into account the inventory of the available asset resources; and, performing a data center asset allocation operation, the data center asset allocation operation allocating resources the workload based upon the determining.

2. The method of claim 1, further comprising:

presenting a workload optimization user interface, the workload optimization user interface enabling optimization of allocation of asset resources to the workload.

3. The method of claim 2, further comprising:

performing an asset choreography operation, the asset choreography operation tracking use of the certain asset resources to determine whether the certain asset resources are underutilized.

4. The method of claim 3, further comprising:

using the certain asset resources that underutilized when maintaining the inventory of available asset resources.

5. The method of claim 2, further comprising:
performing a workload orchestration operation, the workload orchestration operation allocating an underutilized asset resource to the workload.

6. The method of claim 5, wherein:
the workload orchestration operation allocates the underutilized asset resource based upon a capacity of the underutilized asset resource.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
identifying a plurality of asset resources within a data center;
selecting a workload for allocation of asset resources;
maintaining an inventory of available asset resources from the asset resources of the plurality of asset resources;
determining which asset resources of the plurality of asset resources to allocate to the workload, determination of which asset resources of the plurality of asset resources to allocate taking into account the inventory of the available asset resources; and,
performing a data center asset allocation operation, the data center asset allocation operation allocating resources the workload based upon the determining.

8. The system of claim 7, wherein the instructions executable by the processor are further configured for:
presenting a workload optimization user interface, the workload optimization user interface enabling optimization of allocation of asset resources to the workload.

9. The system of claim 8, wherein the instructions executable by the processor are further configured for:
performing an asset choreography operation, the asset choreography operation tracking use of the certain asset resources to determine whether the certain asset resources are underutilized.

10. The system of claim 9, wherein:
using the certain asset resources that underutilized when maintaining the inventory of available asset resources.

11. The system of claim 8, wherein the instructions executable by the processor are further configured for:
performing a workload orchestration operation, the workload orchestration operation allocating an underutilized asset resource to the workload.

12. The system of claim 11, wherein:
the workload orchestration operation allocates the underutilized asset resource based upon a capacity of the underutilized asset resource.

13. A non-transitory, computer-readable storage medium embodying computer program code, the computer program code comprising computer executable instructions configured for:
identifying a plurality of asset resources within a data center;
selecting a workload for allocation of asset resources;
maintaining an inventory of available asset resources from the asset resources of the plurality of asset resources;
determining which asset resources of the plurality of asset resources to allocate to the workload, determination of which asset resources of the plurality of asset resources to allocate taking into account the inventory of the available asset resources; and,
performing a data center asset allocation operation, the data center asset allocation operation allocating resources the workload based upon the determining.

14. The non-transitory, computer-readable storage medium of claim 13, wherein the instructions executable by the processor are further configured for:
presenting a workload optimization user interface, the workload optimization user interface enabling optimization of allocation of asset resources to the workload.

15. The non-transitory, computer-readable storage medium of claim 14, wherein the instructions executable by the processor are further configured for:
performing an asset choreography operation, the asset choreography operation tracking use of the certain asset resources to determine whether the certain asset resources are underutilized.

16. The non-transitory, computer-readable storage medium of claim 15, wherein:
using the certain asset resources that underutilized when maintaining the inventory of available asset resources.

17. The non-transitory, computer-readable storage medium of claim 14, wherein the instructions executable by the processor are further configured for:
performing a workload orchestration operation, the workload orchestration operation allocating an underutilized asset resource to the workload.

18. The non-transitory, computer-readable storage medium of claim 17, wherein:
the workload orchestration operation allocates the underutilized asset resource based upon a capacity of the underutilized asset resource.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *